United States Patent Office 3,019,483
Patented Feb. 6, 1962

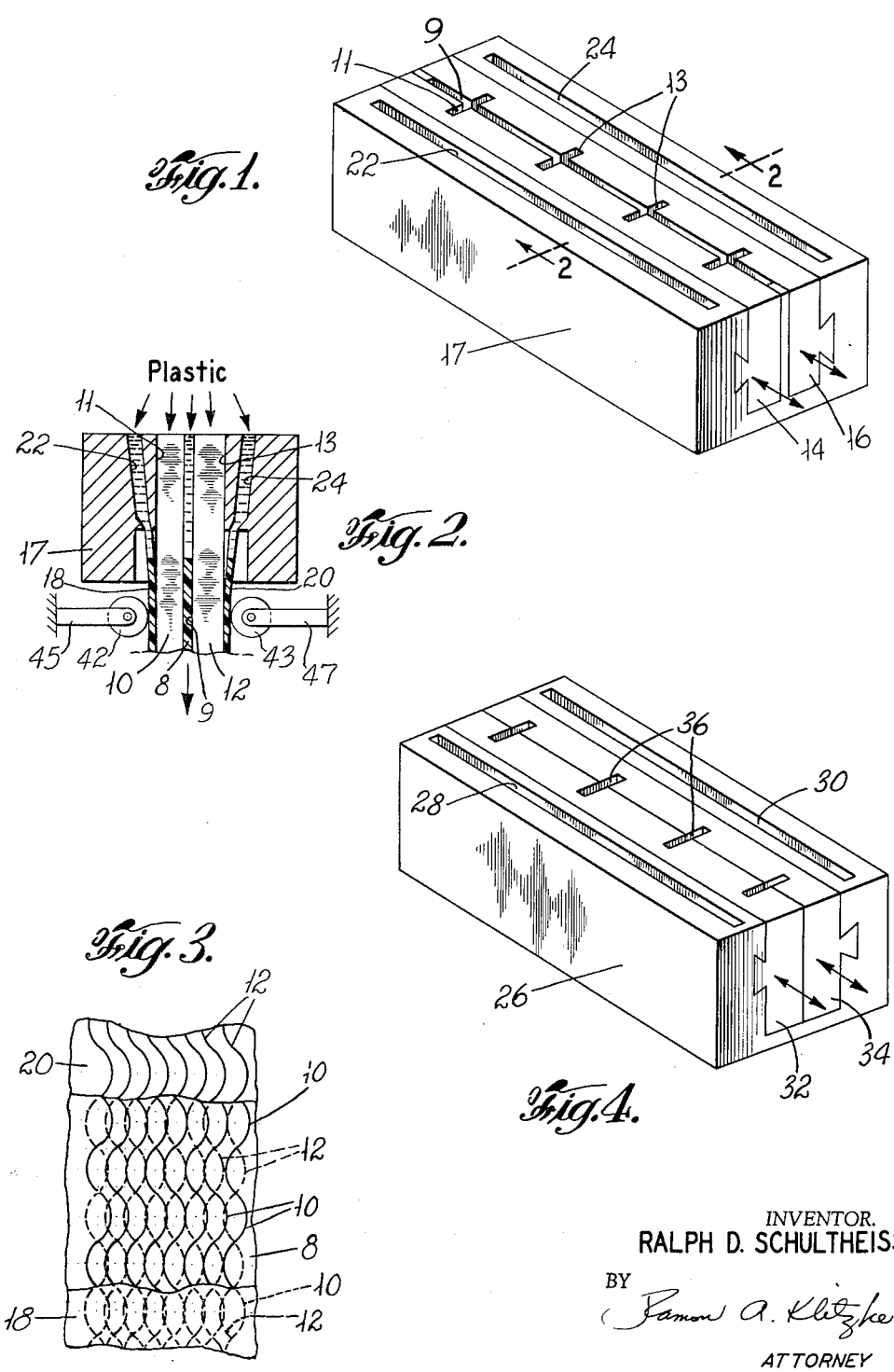

3,019,483
METHOD AND APPARATUS FOR PRODUCING EXTRUDED STRUCTURAL BOARD
Ralph D. Schultheiss, Springdale, Conn., assignor to Union Carbide Corporation, a corporation of New York
Filed May 4, 1959, Ser. No. 810,793
8 Claims. (Cl. 18—12)

This invention relates to a method and apparatus for producing plastic extruded ribbed structural board. More particularly, this invention relates to a method and apparatus for producing extruded ribbed plastic structural board in one extrusion operation without the need of additional working or fastening.

It is known to produce plastic sheets and boards of various shapes and sizes by one or more extrusion steps combined with cutting and fastening steps. No method has ever been advanced, however, entailing the producing of a ribbed structural board in a single extrusion step without the need for additional working or fastening.

It is an object of this invention to provide a method for producing extruded plastic ribbed structural board.

It is a further object of this invention to provide a method for producing extruded plastic structural board having interior ribs in a single extrusion step without the need of additional working or fastening.

It is another object of this invention to provide an apparatus for producing extruded plastic ribbed structural board.

Another object of this invention is to provide an apparatus for producing extruded plastic structural board having interior ribs in a single extrusion step without the need of additional working or fastening.

Other objects and advantages of the invention will become apparent from the following description and appended claims.

According to my invention plastic is extruded in the form of interior supporting ribs while outside membranes are simultaneously extruded on opposite sides of said ribs and attached thereto. The interior ribs of the structural board are extruded through two slotted, reciprocating dies so that the ribs follow oscillating paths.

In another embodiment of my invention, two sets of interior supporting ribs are extruded simultaneously and on either side of an integral extruded central membrane while outside membranes are simultaneously extruded and attached to the outer edges of the supporting ribs. The supporting ribs can be extruded in oscillating or undulating paths on either side of the central membrane and the rib-paths on one side of the membrane may or may not be coincident with the paths of ribs on the other side of the membrane.

The invention will now be explained in detail by reference to the drawings, in which:

FIG. 1 is an isometric view of the extrusion dies of the invention,

FIG. 2 is a cross-sectional view along the line 2—2 of FIG. 1, and

FIG. 3 is a view of a portion of the surface of a typical extruded structural board.

FIG. 4 is an isometric view of a modification of the apparatus of FIG. 1.

Referring now to FIGS. 1, 2 and 3, a central plastic membrane 8 is extruded through the slot 9, formed by open slots in dies 14 and 16, slidably mounted in extrusion block 17 while ribs 10 and 12 are simultaneously extruded through slots 11 and 13 respectively, adjacent to and leading out of slot 9. Slots 11 and 13 are disposed in slidable extruding dies 14 and 16 and the space between these dies forms slot 9. As plastic is extruded downward through slots 9, 11, and 13, dies 14 and 16 are reciprocated in opposite directions so that ribs 10 and 12 from dies 14 and 16, respectively, follow oscillating paths on the central membrane and form thereby the interior supports of the structural board.

Outside membranes 18 and 20 are extruded from slots 22 and 24, respectively, and these membranes join ribs 10 and 12 and are attached thereto. Membranes 18 and 20 form the outside surfaces of the structural board and can be composed of plastics of various colors. Designs can be stamped or extruded thereon. To more firmly bond membranes 18 and 20 to the ribs, means may be disposed below the die support to press the extruded membranes against the extruded ribs. For example, in FIG. 2 rollers 42 and 43 are disposed so as to press membranes 18 and 20 against the ribs 10 and 12. The rollers 41 and 43 are rotatably mounted on rigid supporting members 45 and 47, respectively. The temperature of the plastic should be not more than about 50° C. less than the temperature of extrusion at the time the outside membranes are attached.

It is seen that varying the speed and regularity of the reciprocation of extrusion dies 14 and 16 permits the supporting ribs to be placed in a great many different designs. The structural board produced is strong and light and readily lends itself to a great number of uses for buildings, advertising displays, furniture etc.

In FIG. 4 is shown another embodiment of my invention. A support member 26 having outside membrane extrusion slots 28 and 30 therein supports slidably mounted extrusion dies 32 and 34 having coinciding slots 36 therein. Unlike the extrusion device of FIG. 1, the extruder of FIG. 4 is without a central extrusion slot 9 so that interior supporting ribs extruded from slots 36 are integral with each other rather than with a central membrane. The advantage of this variation is, of course, a saving in the amount of material used.

Any extrudable plastic, thermoplastic or thermosetting can be used in this invention. The temperature of extrusion will vary with the plastics used.

I claim as my invention:

1. A method for producing a ribbed structural board comprising extruding a multiplicity of substantially parallel rib-forming streams of plastic material; reciprocating said rib-forming streams in a direction transverse to the direction of extrusion so as to alternately contact and separate the edges of adjacent rib-forming streams; extruding simultaneously with said rib-forming streams thin membrane-forming streams of plastic material adjacent to the outer edges of said rib-forming streams, and contacting said membrane-forming stream with the outer edges of said rib-forming streams.

2. A method for producing a ribbed structural board comprising extruding a multiplicity of substantially parallel strip-forming streams of plastic material; periodically dividing and reuniting each of said strip-forming streams so as to form separate undulating rib-forming streams; extruding simultaneously with said rib-forming streams thin membrane-forming streams of plastic material adjacent to the outer edges of said rib-forming streams; and contacting said membrane-forming streams with the outer edges of said rib-forming streams.

3. A method for producing a ribbed structural board comprising extruding at least two spaced apart membrane-forming streams of plastic material; extruding simultaneously with said membrane-forming streams a multiplicity of substantially parallel rib-forming streams of plastic material in the space between said membrane-forming streams; reciprocating said rib-forming streams in a direction transverse to the direction of extrusion so as to alternately contact and separate the edges of adjacent rib-forming streams; and contacting said membrane-forming streams with the outer edges of said rib-forming streams.

4. A method for producing a ribbed structural board comprising extruding at least two spaced apart membrane-forming streams of plastic material; extruding a multiplicity of substantially parallel of strip-forming streams of plastic material in the space between said membrane-forming streams; periodically dividing and reuniting each of said strip-forming streams so as to form separate undulating rib-forming streams; and contacting said membrance-forming streams with the outer edges of said undulating rib-forming streams.

5. A method for producing a ribbed structural board comprising extruding three spaced apart membrane-forming streams of plastic material; extruding simultaneously with said membrane-forming streams a multiplicity of substantially parallel strip-forming streams of plastic material in the spaces between said membrane-forming streams; periodically dividing and reuniting each of said strip-forming streams so as to form separate undulating rib-forming streams; and contacting said membrane-forming streams with the edges of said undulating rib-forming streams.

6. An apparatus for producing plastic ribbed structural board which comprises a die support member, a first extrusion die slidably mounted on said die support member and having a multiplicity of relatively thin supporting rib extrusion slots adjacent to and extending perpendicularly from one side face of said extrusion die, a second extrusion die slidably mounted on said die support member having one side face disposed adjacent to said side face of said first extrusion die, said second extrusion die having a multiplicity of relatively thin supporting rib extrusion slots adjacent to and extending perpendicularly from said die face adjacent to said first die, said extrusion slots in said second die being so disposed that they can be coincided with said slots in said first die by slidably adjusting said dies, said support member having a relatively thin extrusion slot disposed substantially parallel with and in proximity to said first extrusion die, said support member having a second relatively thin extrusion slot disposed substantially parallel with and in proximity to said second extrusion die, and means for reciprocally sliding said slidably mounted extrusion dies.

7. An apparatus for producing plastic ribbed structural board which comprises a die support member, a first extrusion die slidably mounted on said die support member and having a relatively thin open slot along one edge thereof and at least one relatively thin slot adjacent to and at a right angle with said open slot, a second slidably mounted extrusion die mounted on said die support and having a relatively thin open slot along one edge thereof and at least one relatively thin slot adjacent to and at a right angle with said open slot, said second extrusion die being disposed adjacent to said first die whereby said open slots are adjacent and together form a single extrusion slot, said support member having a relatively thin extrusion slot disposed substantially parallel with and in proximity to said first extrusion die, said support member having a second relatively thin extrusion slot in said die support and disposed substantially parallel with and in proximity to said extrusion die, and means for reciprocally sliding said slidably mounted extrusion dies.

8. An apparatus for producing plastic ribbed structural board which comprises a die support member, a first extrusion die slidably mounted on said die support member and having a relatively thin open slot along one edge thereof and at least one relatively thin slot adjacent to and at a right angle with said open slot, a second slidably mounted extrusion die mounted on said die support and having a relatively thin open slot along one edge thereof and at least one relatively thin slot adjacent to and at a right angle with said open slot, said second extrusion die being disposed adjacent to said first die whereby said open slots are adjacent and together form a single extrusion slot, said die support member having a relatively thin extrusion slot disposed substantially parallel with and in proximity to said first extrusion die, said die support member having a second relatively thin extrusion slot disposed substantailly parallel with and in proximity to said second extrusion die, and means for reciprocally sliding said slidably mounted extrusion dies, and means disposed below said extrusion slots in said die support for pressing plastic extruded from said slots against plastic extruded from said slidably mounted extrusion dies.

References Cited in the file of this patent
UNITED STATES PATENTS

| | | |
|---|---|---|
| 1,603,813 | Stein | Oct. 19, 1926 |
| 1,661,069 | Hartung | Feb. 23, 1928 |
| 2,091,125 | Stewart | Aug. 24, 1937 |
| 2,319,225 | Grebe et al. | May 18, 1943 |
| 2,489,951 | Bump | Nov. 29, 1949 |
| 2,520,222 | Stone | Aug. 29, 1950 |
| 2,682,292 | Nagin | June 29, 1954 |